Figure 1:
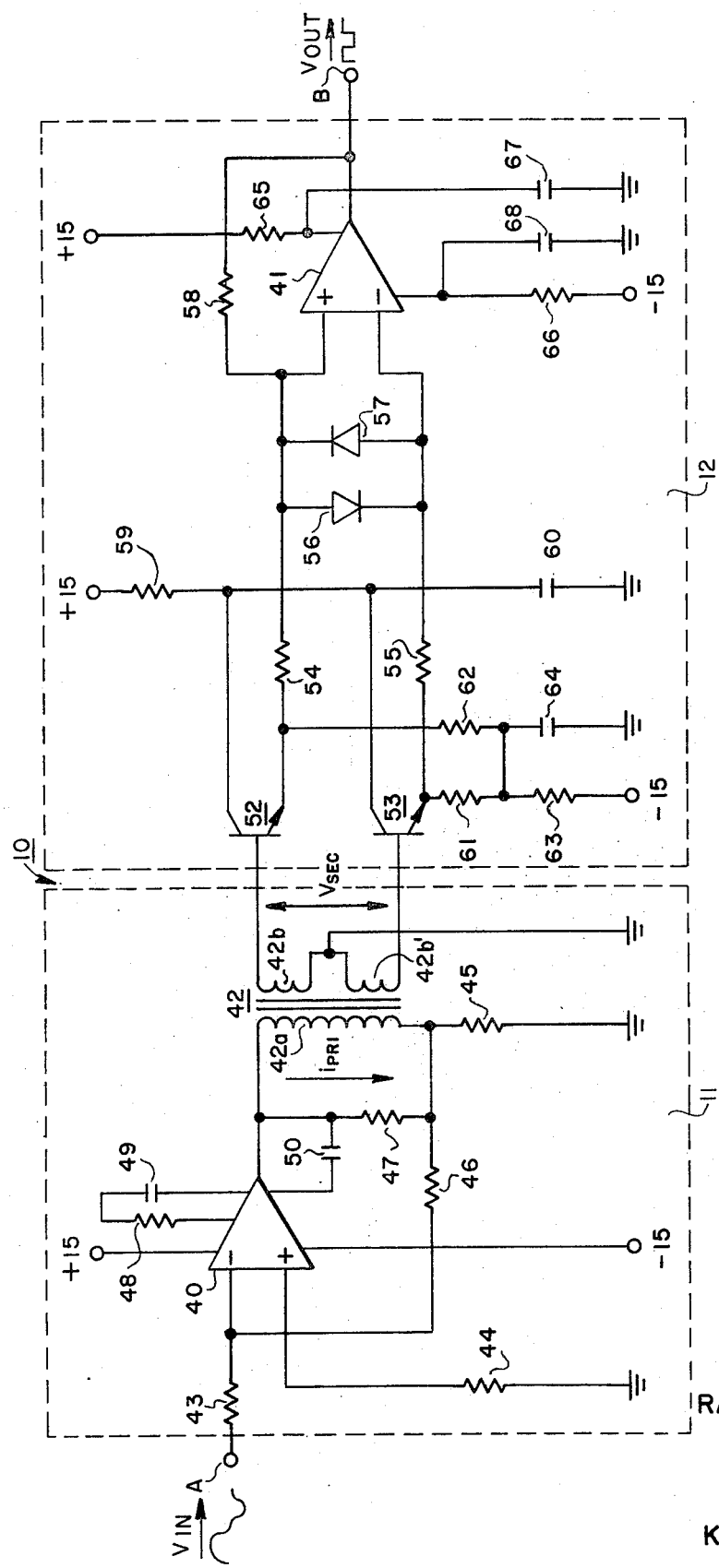

United States Patent [19]
Arnold

[11] 3,766,411
[45] Oct. 16, 1973

[54] PEAK DETECTOR
[75] Inventor: Raymond D. Arnold, Richardson, Tex.
[73] Assignee: Intermedcraft Corp., Dallas, Tex.
[22] Filed: Nov. 27, 1970
[21] Appl. No.: 93,290

[52] U.S. Cl............. 307/235 A, 328/114, 328/115, 328/132
[51] Int. Cl. ........................................... H03k 5/20
[58] Field of Search.................... 307/231, 235, 236; 328/114, 132

[56] References Cited
UNITED STATES PATENTS
3,449,593   6/1969   Marino ........................... 328/132 X
3,048,717   8/1962   Jenkins ........................... 328/114 X
3,248,560   4/1966   Leonard .......................... 328/114 X
3,437,833   4/1969   Razaitis et al. .................. 328/114 X Primary Examiner—John Zazworsky
Attorney—Kenneth R. Glaser and John F. Booth

[57] ABSTRACT

A detector for detection of the maximum and minimum peaks of an incoming signal employs a pair of operational amplifiers coupled by a transformer, the output from the secondary of the transformer being coupled through a pair of emitter follower networks to the input terminals of the second operational amplifier. A pair of diodes in parallel and opposite relationship are coupled across the input terminals of the second operational amplifier.

17 Claims, 2 Drawing Figures

PEAK DETECTOR

The present invention relates to the decoding of an electrical signal, more particularly to the detection of the maximum and minimum peaks of the electrical signal, and even more particularly to a method and apparatus for detection of the zero crossing points of a voltage proportional to the slope of the incoming electrical signal.

There are many decoders or detectors utilized in the electronic industry today which detect or are responsive to the maximum and minimum peaks of an electrical signal. Many of these detectors employed are zero slope detectors which produce output pulses responsive to the points at which the rate of change of the electrical signal with respect to time is zero. While these zero slope detectors offer many advantages over other types of detectors, the present models are not entirely satisfactory. Among the difficulties of these present zero slope detectors is that their response is dependent not only upon the zero slope point of the detected signal, but also upon the actual amplitude of the electrical signal at the point of zero slope. This produces a signal to noise degradation since any variation in the peak amplitudes of the signal will cause a corresponding variation in the detector response of each signal peak.

It is therefore a primary object of the present invention to provide a new and improved apparatus and method for detecting the maximum and minimum peaks of an electrical signal.

It is another object of the present invention to provide a new and improved apparatus and method for detecting the peaks of an electrical signal and for producing output pulses which are independent of variations in the amplitudes of the electrical signal peaks.

It is a further object of the invention to provide new and improved apparatus and method for producing an output pulse responsive to the detection of a zero rate of change, or zero slope, of an incoming electrical signal, such output pulse being independent of amplitude variation of the peaks of such electrical signal.

It is an even further object of the invention to provide improved apparatus for decoding an electrical signal, particularly an electrical signal representing information which has previously been stored on magnetic recording medium.

In accordance with these and other objects, the present invention is directed to a peak detector having a first circuit portion which detects the rate of change of the incoming electrical signal with respect to time (slope) and a second coupled portion which produces output pulses responsive to the slope passing through zero. Specifically, the detector consists of an input operational amplifier with output loading provided by a coupling transformer for transforming the incoming voltage signal to a signal at the output of the transformer which is proportional to the slope of the incoming signal, and an output operational amplifier switch responsive to the changes in polarity of the slope signal produced at the secondary of the coupling transformer, the output pulses from the operational amplifier switch being nonresponsive to, and independent of, variations in the peak amplitudes of the incoming voltage signal. Since the response of the detector is determined solely by the change in sign of the slope of the incoming detected signal, the signal to noise ratio degradation associated with prior detectors is substantially reduced.

Such a peak detector as embodies the present invention can be of wide use in the electronics field. For example, it is common practice to record and store electrical signals on magnetic tape for later playback of these signals by means of a reproducer portion of the magnetic tape apparatus. Since the response of the improved design of the detector herein is dependent solely upon the changes in sign of the slope of the incoming signal, substantial advantages are achieved by incorporation of this detector into the reproducer portion since any distortions in the magnitude of electrical signals due to imperfections of the tape itself would not deleteriously affect the response of this detector.

Figure 2:
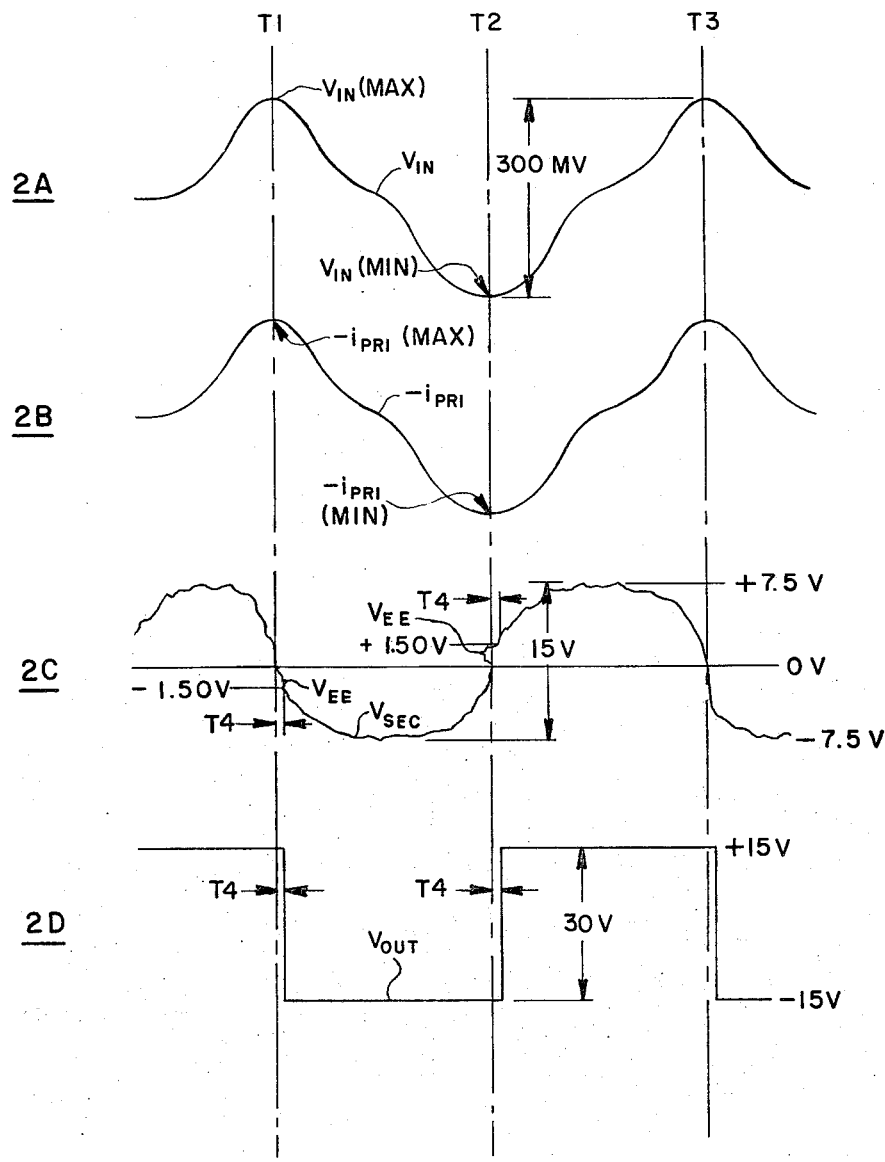

For a more complete understanding of the invention, and for further objects, advantages and features thereof, reference may now be made to the following detailed description taken in conjunction with the accompanying drawings, in which:

FIG. 1 is the circuit schematic of the peak detector embodying the present invention; and FIG. 2 illustrates, in time relationships, graphs of the various signals resulting from the operation of the circuit of FIG. 1.

Referring now to FIG. 1, the peak detector 10 of the present invention consists of an input circuit portion 11 for producing a signal $V_{SEC}$ proportional to the rate of change with respect to time (slope) of an incoming signal $V_{IN}$ applied to the input terminal A; and an output circuit portion 12 for producing pulses $V_{OUT}$ at the output terminal B responsive to polarity changes in the signal $V_{SEC}$. The output pulses $V_{OUT}$, while being indicative of when the maximum and minimum peaks of the incoming electrical signal $V_{IN}$ occur, are nevertheless independent of the relative magnitudes of these peaks, as subsequently more fully described.

Accordingly, the incoming signal $V_{IN}$ is coupled through a resistor 43 to the inverting terminal (−) of an operational amplifier 40, the non-inverting input (+) of the amplifier 40 being coupled to ground through resistor 44. The amplifier 40 is biased in the conventional manner by positive and negative voltages illustrated, for example, in FIG. 1 as +15 and −15 volts, respectively. Internal control for the amplifier 40 is provided by the resistor 48 and capacitors 49 and 50, all as conventionally known.

The output of the operational amplifier 40 is coupled to a load network comprising resistors 45 and 47 and the primary winding 42a of a transformer 42, resistor 46 providing a feedback loop to the inverting terminal of the amplifier 40. The transformer 42 includes a pair of secondary windings 42b and 42b', a center tap to ground being provided so that one-half of the voltage $V_{SEC}$ appears across each of these windings.

The outputs from the secondary windings 42b and 42b' of the transformer 42 are respectively coupled to the non-inverting (+) and inverting (−) input terminals of another operational amplifier 41 through emitter followers 52 and 53 and load resistors 54 and 55, respectively. Collector bias of emitter followers 52 and 53 are provided by way of resistor 59 and capacitor 60; emitter bias to these transistors are provided by way of resistors 61–63 and capacitor 64.

Bias for the operational amplifier 41 is provided by the positive and negative supply voltages, for example +15 and −15 volts, respectively, resistors 65 and 66, and capacitors 67 and 68 in the manner illustrated. Resistor 58 provides feedback from the output of the operational amplifier to its non-inverting (+) input. Operational amplifier 41 acts as a voltage comparator having a bistable output, pulses being produced at the terminal B in response to changes in polarity, and a predetermined minimum value, of a differential voltage applied across the inverting and non-inverting terminals of the amplifier 41. As a specific feature, the predetermined minimum value of this differential voltage is determined by the amount of positive feedback to the amplifier 41, this feedback amount in turn being determined by the ratio of the value of resistor 54 to the value of resistor 58, as subsequently described in greater detail.

Diodes 56 and 57 are disposed in parallel and opposite polarity across the input terminals of amplifier 41 and provide voltage protection therefor.

Referring now to FIGS. 1 and 2, the operation of the detector 10 is described. Accordingly, an input voltage $V_{IN}$ (a typical waveform of which is illustrated in FIG. 2A) is applied to the input terminal A. Solely for purposes of illustration, the waveform is represented as having a peak to peak value of 300 mV, the maximum and minimum peaks occurring at the time intervals $T_1$, $T_2$, and $T_3$, respectively. Since the input voltage is applied to the inverting input of the operational amplifier, an output signal is produced therefrom which is shifted 180° from the input signal, this output signal being applied to the load network including the primary winding 42a.

As a specific feature herein, the resistive value of the transformer primary winding 42a is negligible with respect to that of resistor 47, and the resistive value of the resistor 45 is substantially smaller than the resistive value of the feedback resistor 46. Consequently, substantially all of the current at the output of the amplifier 40 is caused to flow through the primary winding 42a to ground, this current being designated in FIG. 1 as $i_{PRI}$. This current, which for convenience has been represented in FIG. 2A as $-i_{PRI}$, is thereby proportional to the input signal $V_{IN}$.

As a consequence of the current flow through the primary winding 42a, an output voltage $V_{SEC}$ is induced across the secondary windings 42b and 42b' of the transformer 42 proportional to the rate of change (slope) of the current $i_{PRI}$ (and consequently the rate of change of the signal $V_{IN}$) with respect to time. This voltage $V_{SEC}$ is illustrated in FIG. 2C having a peak to peak value of, say 15 volts for example. It is to be noted that the waveform shown in FIG. 2C is not necessarily the actual shape of the voltage signal $V_{SEC}$ but is utilized to represent the general outline of the various voltage points representing the changing slope of the input signal $V_{IN}$, the zero crossing points of the signal $V_{SEC}$ corresponding to the maximum and minimum peaks of the incoming signal $V_{IN}$.

As previously described, the voltage $V_{SEC}$ is applied to the inputs to emitter followers 52 and 53. It is to be noted that the transistors 52 and 53 are always biased in the forward current flow direction, and the characteristics of the transistors 52 and 53, are desirably identical. Consequently the voltage differential across the windings 42b and 42b' is substantially identical to the voltage differential across the transistor outputs.

As previously stated, the operational amplifier 41 is a bistable device changing state and producing positive and negative pulses only when there is a polarity change of the differential voltage applied across its input terminals. Thus, since the differential voltage applied to these input terminals is proportional to the voltage $V_{SEC}$, these pulses, which are illustrated as $V_{OUT}$ in FIG. 2D, occur in response to the signal $V_{SEC}$ passing through the zero crossing points shown in FIG. 2C, the pulses varying between plus and minus 15 volts, for example. It is thus to be noted that since the zero crossing points correspond to the change in sign of the slope of the signal $V_{IN}$, the output signal pulses $V_{OUT}$ are responsive to the occurrence of the maximum and minimum peaks of the input signal, but are independent of the values of these peaks.

It is noted that the pulses of $V_{OUT}$ actually are illustrated in FIG. 2D as occurring at a specific time interval $T_4$ after the occurrence of the maximum and minimum peaks of $V_{IN}$. This is primarily due to the combinational effect of the positive feedback and the relative values of resistor 58 and resistor 54 which assures that the amplifier 41 switch only at a true peak of the input signal. Accordingly, the ratio of the resistor 54 to resistor 58 times the value of the output pulse at terminal B establishes a predetermined minimum value of voltage which must be exceeded by the slope voltage $V_{SEC}$ to trigger the amplifier 41. Thus, in order for the operational amplifier 41 to change stage, the signal $V_{SEC}$ must not only pass through the zero crossing point but must exceed a threshold value (designated $V_{EE}$ in FIG. 2C) equal to this predetermined minimum value. The time periods $T_4$ then represent the time after which this threshold is reached after the signal $V_{IN}$ has reached its maximum or minimum peak, as the case may be.

The provision of this threshold value $V_{EE}$ assures that if the slope of the signal $V_{IN}$ approaches zero, but is in fact not exactly zero (thus not exactly the maximum and minimum peak thereof) that any noise within the system does not falsely trigger the operational amplifier 41. In one particular example, the ratio of the value of the resistor 54 to that of resistor 58 is 0.1, thus establishing the threshold value $V_{EE}$ shown in FIG. 2C as plus or minus 1.50 volts.

The detector apparatus 10 of the present invention is particularly suitable for inclusion in the reproducer portion of magnetic tape apparatus, the input signals thereto being the reproduced signals previously recorded on the magnetic tape. An example of this type of apparatus is described in copending patent application Ser. No. 811,856, filed Apr. 1, 1969, and assigned to the assignee of the present application. In such an instance the apparatus 10 would be employed as the decoder of the reproduction portion.

It is to be understood that the input signal $V_{IN}$ illustrated in FIG. 2A is merely representative of one waveform whose maximum and minimum peaks are being detected. In addition various values and types of circuit components may be utilized for the circuit illustrated in FIG. 1. In accordance with one specific circuit that has been successfully built and operated, however, the following Table I sets forth specific types and values of circuit components:

TABLE I

| Reference Designation | Description |
| --- | --- |
| Resistor 43 | 2.4 K ohms |
| Resistor 44 | 3.6 K ohms |
| Resistor 46 | 15 K ohms |
| Resistor 47 | 6.8 K ohms |
| Resistor 48 | 1.5 K ohms |
| Resistors 45, 59, 63, 65, 66 | 100 ohms |
| Resistors 61, 62 | 2.2 K ohms |
| Resistor 54, 55 | 10 K ohms |

| | |
|---|---|
| Resistor 58 | 100 K ohms |
| Capacitor 49 | 500 pf |
| Capacitor 50 | 20 pf |
| Capacitors 60, 64 | 2.2 μf |
| Capacitors 67, 68 | 5 μf |
| Diodes 56, 57 | 1N456A |
| Transistors 52, 53 | T1592 |
| Operational Amplifiers 40, 41 | Fairchild μA709 |
| Transformer 42 | Indiana General Corporation, Type CF 111-0-6 Ferramic toroid with primary formed by 70 turns of No. 30 copper wire and secondary formed by 140 turns of No. 30 copper wire |

Various modifications to the disclosed embodiment, as well as alternate embodiments, may become apparent to one skilled in the art without departing from the scope and spirit of the invention as defined by the appended claims.

What is claimed is:

1. Slope detecting apparatus, comprising:
   a. first means for producing an output signal proportional to the rate of change with respect to time of incoming electrical signal, and
   b. second means comprising a voltage comparator having a pair of input terminals, the proportional output signal from said first means being coupled across said pair of input terminals, said second means producing output pulses responsive to both positive and negative polarity changes of said proportional output signal, thereby to detect the maximum and minimum peaks of said incoming electrical signal.

2. The apparatus as described by claim 1 wherein said first means is a transformer and said voltage comparator has its pair of input terminals coupled to the secondary of said transformer.

3. Apparatus for detecting the maximum and minimum peaks of a time varying electrical signal, comprising:
   a. input and output terminals,
   b. transformer means coupled to the input terminal for producing an output voltage proportional to and having a polarity indicative of the slope of said time varying electrical signal,
   c. a first operational amplifier having its inverting and non-inverting terminals coupled to the secondary of said transformer means, said operational amplifier producing output pulses at said output terminal in response to changes in polarity of the said output voltage.

4. The apparatus as described in claim 3 including means coupled to the non-inverting terminal of said operational amplifier for controlling the voltage applied across said inverting and non-inverting terminals.

5. The apparatus as described in claim 3 including a second operational amplifier connected between said input terminal and the primary of said transformer means for producing a current through said primary proportional to said time varying electrical signal.

6. The apparatus as described in claim 4 wherein said voltage controlling means comprises a pair of resistors coupled to said non-inverting terminal, one of said resistors being coupled to the output of the operational amplifier, the other of said resistors being coupled to the secondary of the transformer.

7. A slope detector comprising:
   a. a first operational amplifier,
   b. means for applying an incoming voltage signal to the inverting input of said first operational amplifier,
   c. a transformer with one end of the primary winding coupled to the output of said first operational amplifier,
   d. feedback resistor means coupling the other end of said transformer primary winding to the inverting input of said first operational amplifier,
   e. a load resistor coupling the junction of said feedback resistor means and said transformer primary winding to ground, said load resistor having a resistance substantially smaller than said feedback so that current flow in said feedback means is minimized and the current flow in said transformer primary varies directly proportional to said incoming voltage signal,
   f. a second operational amplifier having its inverting input coupled to one end of the secondary winding of said transformer and its non-inverting input coupled to the other end of the transformer secondary winding, and
   g. a second feedback resistor coupled from the output of said second operational amplifier to its non-inverting input.

8. The slope detector as set forth in claim 7 further including:
   a. a first emitter follower transistor connected by way of a resistor between the non-inverting input of the second operational amplifier to the said one end of said transformer secondary winding, and
   b. a second emitter follower transistor connected by way of another resistor between the inverting input of the second operational amplifier to the said other end of said transformer secondary winding,
   c. the ratio of the first mentioned resistor to the second feedback resistor controlling the point at which output pulses are produced by said second operational amplifier.

9. In a system for the reproduction of electrical signals previously recorded and stored on a magnetic storage medium, slope detector means incorporated within said reproduction system for producing signal pulses representative of the maximum and minimum peaks of said electrical signals, comprising:
   a. first means for producing output signals proportional to the rate of change with respect to time of said electrical signals, and
   b. second means comprising a voltage comparator having a pair of input terminals, the proportional output signals from said first means being coupled across said pair of input terminals, said second means producing output pulses responsive to both positive and negative polarity changes of said output proportional signals.

10. In a system for the reproduction of electrical signals previously recorded and stored on a magnetic storage medium, slope detector means incorporated within said reproduction system for producing signal pulses representative of the maximum and minimum peaks of said electrical signals, comprising:
   a. first means comprising a transformer for producing output signals proportional to the rate of change with respect to time of said electrical signals, and
   b. second means comprising a voltage comparator having a pair of input terminals coupled to the secondary of said transformer for producing output pulses responsive to both positive and negative polarity changes of said output proportional signals.

11. The apparatus as defined in claim 10 wherein said second means is an operational amplifier.

12. The apparatus as defined in claim 12 wherein said operational amplifier has inverting and non-inverting terminals, which are the said pair of input terminals, coupled to the secondary of said transformer.

13. The apparatus as described in claim 12 including means coupled to said operational amplifier for controlling the voltage applied across said inverting and non-inverting terminals.

14. The apparatus as described in claim 13 including a second operational amplifier coupled to the primary of said transformer for producing a current through said primary proportional to said electrical signals.

15. The apparatus as described in claim 13 wherein said voltage controlling means comprises a pair of resistors coupled to said non-inverting terminal, one of said resistors being coupled to the output of the operational amplifier, the other of said resistors being coupled to the secondary of the transformer.

16. Slope detecting apparatus, comprising:
a. means including a transformer for producing an output signal proportional to the rate of change of amplitude with respect to time of an incoming electrical signal, and
b. voltage comparator means having a pair of input terminals coupled to the secondary of said transformer for producing output pulses responsive to polarity changes of said proportional output signal, thereby to detect the maximum and minimum peaks of said incoming electrical signal.

17. Apparatus for detecting the maximum and minimum peaks of an amplitude varying electrical signal, comprising:
a. first means for producing an output signal proportional to the rate of change of said amplitude with respect to time of said amplitude varying electrical signal,
b. second means coupled to the input of said first means for providing a full wave representation of both the maximum and minimum peaks of said amplitude varying electrical signal; and
c. third means comprising a voltage comparator having a pair of input terminals, the proportional output signal from said first means being coupled across said pair of input terminals, said third means producing output pulses responsive to changes in polarity of said proportional output signal in both the positive and negative direction, thereby to detect both the maximum and minimum peaks of said amplitude varying electrical signals.

* * * * *